United States Statutory Invention Registration [19]

[11] Reg. Number: H975

Selkowitz et al. [43] Published: Nov. 5, 1991

[54] THERMAL INSULATED GLAZING UNIT

[75] Inventors: Stephen E. Selkowitz, Piedmont; Dariush K. Arasteh, Oakland, both of Calif.; John L. Hartmann, Seattle, Wash.

[73] Assignee: The United States of America as represented by the United States Department of Energy, Washington, D.C.

[21] Appl. No.: 428,539

[22] Filed: Oct. 30, 1989

Related U.S. Application Data

[63] Continuation-in-part of Ser. No. 319,871, Mar. 1, 1989, abandoned, which is a continuation of Ser. No. 178,043, Apr. 5, 1988, abandoned.

[51] Int. Cl.[5] ..... E06B 7/12

[52] U.S. Cl. ..... 52/172

[56] References Cited

U.S. PATENT DOCUMENTS

| | | | |
|---|---|---|---|
| 3,192,575 | 7/1965 | Rosenau et al. | 52/171 |
| 3,875,706 | 4/1975 | Okawa | 52/172 |
| 4,019,295 | 4/1977 | Derner et al. | 52/171 |
| 4,038,797 | 8/1977 | Hermann et al. | 52/306 |
| 4,081,934 | 4/1978 | Franz | 52/171 |
| 4,149,348 | 4/1979 | Pyzewski | 52/172 |
| 4,393,105 | 7/1983 | Kreisman | 428/34 |
| 4,459,789 | 7/1984 | Ford | 52/656 |
| 4,536,998 | 8/1985 | Matteucci et al. | 52/171 |
| 4,613,530 | 9/1986 | Hood et al. | 428/34 |

FOREIGN PATENT DOCUMENTS 1143256 11/1966 United Kingdom .

OTHER PUBLICATIONS

Glass Magazine, "Low-E", 3-1986, p. 116-131.

Popular Science, "Superwindows", Elaine Gilmore, 3-1986, pp. 76-77.

*Primary Examiner*—Michael J. Carone

*Attorney, Agent, or Firm*—B. J. Weis; L. E. Carnahan; William R. Moser

[57] ABSTRACT

An improved insulated glazing unit is provided which can attain about R5 to about R10 thermal performance at the center of the glass while having dimensions about the same as those of a conventional double glazed insulated glazing unit. An outer glazing and inner glazing are sealed to a spacer to form a gas impermeable space. One or more rigid, non-structural glazings are attached to the inside of the spacer to divide the space between the inner and outer glazings to provide insulating gaps between glazings of from about 0.20 inches to about 0.40 inches. One or more glazing surfaces facing each thermal gap are coated with a low emissivity coating. Finally, the thermal gaps are filled with a low conductance gas such as krypton gas.

21 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THERMAL INSULATED GLAZING UNIT

The Government has rights in this invention pursuant to Contract No. DE-AC03-76SF00098 awarded by the U.S. Department of Energy.

This application is a continuation in part of Ser. No. 07,319,871 filed Mar. 1, 1989, now abandoned which is a file wrapper continuation of Ser. No. 07, 178,043 filed Apr. 5, 1988 now abandoned.

BACKGROUND OF THE INVENTION

The use of insulation, weather stripping and other energy conserving products in the construction and renovation of buildings have successfully reduced the energy required for heating and cooling such buildings because the use of such products impedes the transmission of heat through walls, floors, and roofs. However, even with the construction and use of highly insulated buildings much energy is still unnecessarily wasted in heating and cooling due to heat transmission through windows.

The earliest response to this problem was the development of double glazed windows (R2—a thermal resistance of 2 hr-ft2-deg F/BTU) to replace single glazed (R1) windows. Such thermal window assemblies are usually constructed by placing sealed insulated glazing ("IG") units having the desired number of glazing layers in conventional window frames. "IG" is used in the art to refer to insulated glass units; however, because the applicants foresee glazing as being comprised of materials other than glass, the term "IG" units when used herein will not refer to a specific material but to insulated glazing units generally. While the addition of further glazing layers to the IG unit provides a moderate gain in insulating performance, it also adds weight and bulk to the window and reduces the transmission of light.

Since radiative transfer is a significant portion of heat transfer in a typical multi-glazed window, low emittance coatings have been developed which reflect long wavelength infrared energy and reduce window heat transfer. The addition of a low-emittance (low-E) coating to a double glazed IG unit provides the thermal efficiency of triple glazing (R3) without the additional weight, bulk and complexity.

Further improvements have been made possible by the addition of a low conductance gas to the space between the low-E glazings to reduce the other major component of heat transfer—conductive/convective heat transfer. For example, U.S. Pat. No. 4,459,789 discloses the use of Freon (Bromotrifluoromethane) gas in a sealed window assembly. In addition, some manufacturers offer argon gas filled IG units to provide about an R4 window assembly.

To provide further significant energy savings, sealed IG units need to be in the R5–R10 region. To achieve these performance values, such windows will have to further decrease both radiative as well as conductive/-convective heat transfer.

One way of constructing such an R5–R10 IG unit would be to use 3, 4 or more glazing layers with low-E coatings and possibly argon gas. However, such units would be very bulky and heavy if glass is used as the inner glazing layers. This is due primarily to the optimum thermal spacing between glazing layers, although the thickness of the inner glazings will add to the bulk of the units, since the thermal gap is measured from an interior surface of one glazing to the facing surface of an adjacent glazing. For air or argon, for example, optimum gap widths between glazings are about 0.5 inches thick; smaller gaps are not thermally efficient. Thus, a quadruple glazed IG unit would be at least 2 inches thick and much heavier than a conventional double glazed window. While the weight could be reduced by using thin plastic films as the middle glazing layers, the necessary gaps would require a bulky, complex, and expensive mechanism and assembly process to stretch the thin plastic into a taut, wrinkle free layer. Further, the use of too many glazing layers may reduce light transmission to unacceptable levels. Finally, the necessary gaps between the glazing layers would essentially rule out the use of such windows in much of the large residential market which is oriented around sealed IG units ranging from 0.75 to 1 inches thick.

Several options for R5–R10 windows using new technologies are under development but are not yet commercially available. In one such R5–R10 window the space between the glazing layers in a low-E coated double glazed window is evacuated in order to reduce heat transfer. In another such R5–R10 window, the space between two glazing layers is filled with aerogel, a transparent insulating material. These new technologies, while providing R5–R10 insulation, also have inherent disadvantages due to the high costs of such windows, commercial production processes and final visual properties which are uncertain, and a large initial capital investment which would likely be required for start-up.

Thus, the need exists for R5–R10 thermal windows which can be easily constructed using commercially available low-E coatings, gases and glazing materials to provide lightweight, sealed thermal windows having dimensions and weight approximately the same as that of a conventional double glazed window. Such windows would greatly increase occupant comfort, reduce occurrences of condensation or frost on the glazing surface, and allow designers to meet more stringent building energy code requirements while providing design flexibility with respect to window area.

SUMMARY OF THE INVENTION

An object of this invention is to provide for improved thermal window IG units using multiple glazings, low emissivity (low-E) coatings, and krypton gas or gas mixtures.

A further object of this invention is to provide an R5 to R10 rated triple glazed IG unit having the approximate dimensions of conventional double glazed insulated units and constructed using commercially available glazings, low emissivity coatings, and krypton gas or gas mixtures.

Other objects of the invention will become readily apparent to those skilled in the art from the following description and the accompanying drawings.

DETAILED DESCRIPTION OF THE INVENTION

The present invention provides an improved IG unit and thermal window constructed using commercially available materials and no major changes in fabrication technologies.

Figure 1:
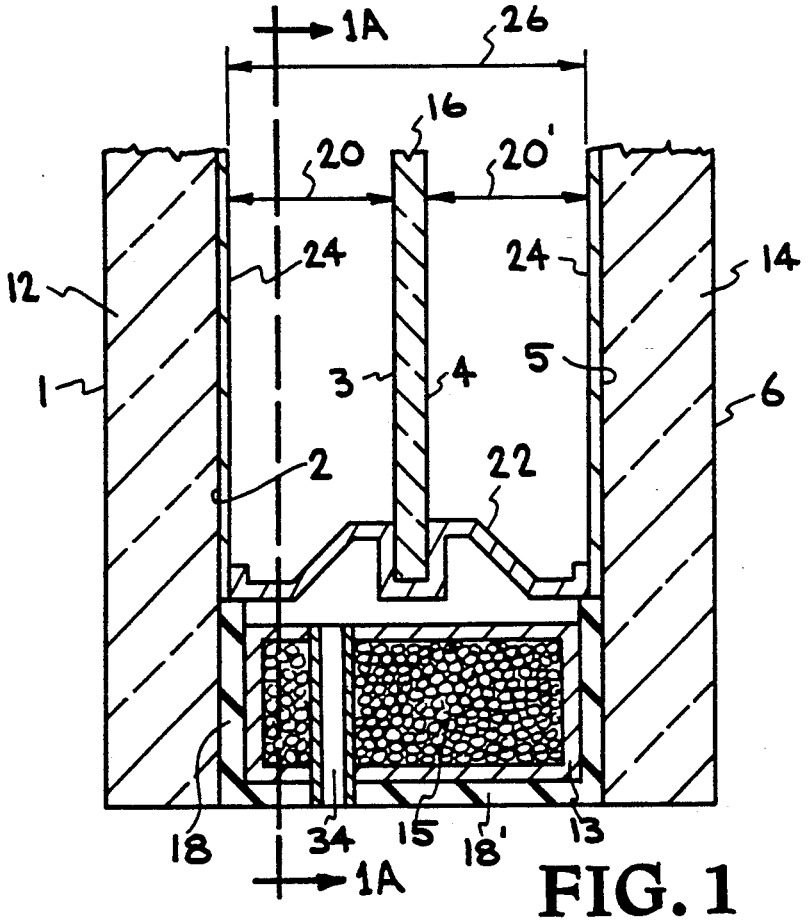
FIG. 1 is a sectional side view of a triple glazed IG unit of the present invention having low emissivity coatings on the center-facing surfaces of the inner and outer glazing.
Figure 1A:
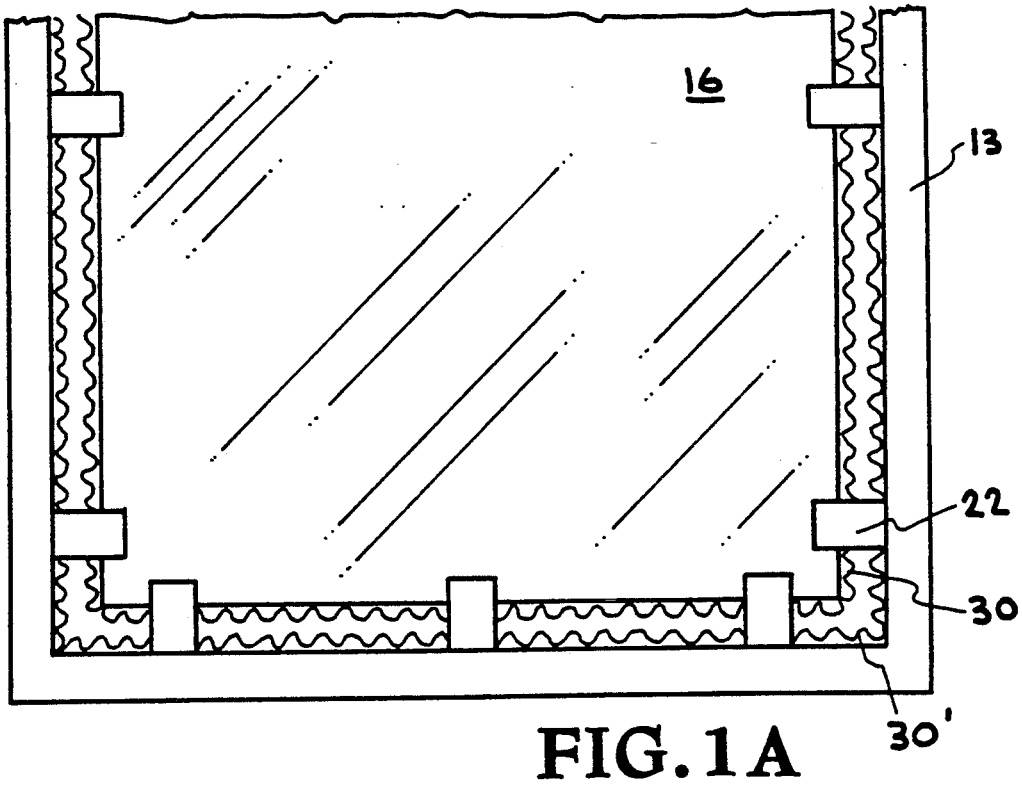
FIG. 1A is a frontal view of a triple glazed IG unit of the present invention showing the middle glazing and inherent peripheral boundary layers.
Figure 2:
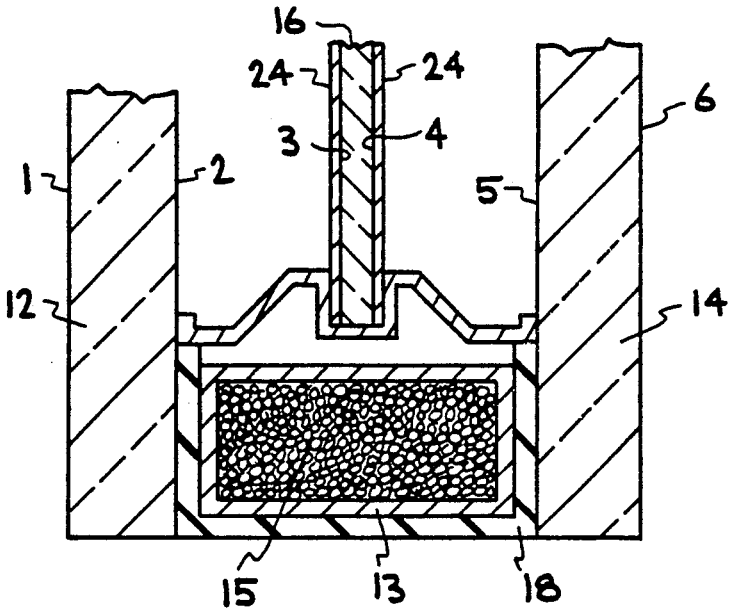
FIG. 2 is a sectional side view of a triple glazed IG unit of the present invention having low emissivity coatings on both surfaces of the middle glazing.

FIGS. 1, 1A and 2 illustrate a typical triple-glazed IG unit of the present invention. It is assumed that the IG unit disclosed herein will preferably be used with a conventionally designed sash and frame. As frame and spacer technology improve to reduce heat transfer, it is anticipated that the overall performance of windows using the IG unit disclosed herein will improve. Although not currently preferred, it would also be possible to apply the concepts of the present invention to construct a thermally insulated window by sealing the inner and outer glazings directly to a frame.

Outer glazing 12, and inner glazing 14 are sealed to opposite ends of spacer 13 such that the center-facing surfaces 2 and 5 face each other. By convention, "inner" refers to the direction of the room or interior of the building and "outer" refers to the direction of the outdoors or exterior of the building. The glazing surfaces are numbered according to convention by looking at the window from the outside in. Thus, the surface of the outer glazing 12 facing the exterior of the building is surface 1, the center-facing surface of outer glazing 12 is surface 2, the surface of middle glazing 16 which faces outer glazing 12 is surface 3, the surface of middle glazing 16 which faces inner glazing 14 is surface 4, the center-facing surface of inner glazing 14 is surface 5, and the surface of inner glazing 14 facing the interior of the building is surface 6.

The outer glazing 12 and inner glazing 14 are preferably of glass having a thickness preferably ranging from about ⅛ inch to about ¼ inch. However, other transparent, gas impermeable, rigid glazing materials may also be used. The dimensions of spacer 13 will determine the size of the gas impermeable space 26 formed between the outer glazing 12 and inner glazing 14 when the glazings are sealed to spacer 13 using one or more appropriate gas impermeable sealants 18, 18' such as, for example, silicone, butyl rubber, polysulfide, polyurethane, or polyisobutylene Between the center-facing surfaces 2, 5 respectively of the glazings 12, 14 is mounted at least one thin, rigid middle baffle here shown as glazing 16. Middle glazing 16 is preferably constructed from glass sheet having a thickness ranging preferably from about 0.04 inches to about 0.06 inches, but no more than about 0.125 inches thick. Other rigid, transparent glazing materials may also be used such as, for example, rigid plastic plates. Middle glazing 16 forms a first thermal gap 20 between outer glazing 12 and middle glazing 16, and a second thermal gap 20' between inner glazing 14 and middle glazing 16. Glazing 16 defines, in combination, with boundary layers 30 and 30' and circumferential spacer 13, a first chamber between glazings 12 and 16 and a second chamber between glazings 14 and 16. Contrary to conventional triple-glazed designs, this middle glazing 16 does not add to the structural integrity of the unit. Thus, the middle glazing need not be intimately sealed to the spacer 13 and need not seal the two thermal gaps 20, 20' from each other since the gap between the middle glazing 16 and the circumferential spacer 13 of less than about 1/16 of an inch will not contribute significantly to convection and may simplify the process of assembly and gas filling.

Spacer 13 will generally be filled with a dessicant 15 which will keep the sealed interior of the I.G. unit dry. Dessicant 15 should be one which will not adsorb krypton gas or other gases used if a krypton gas mixture is used to fill the interior of the I.G. unit.

The middle glazing 16 can be held in place by simple mechanical means such as edge support 22. Clips, grooves, or any other devices which will keep the glazing stationary may also be used. If materials with a potential for creep, that is elongate or other distortion with time (such as plastic) are used for middle glazing 16, such materials could be suspended from the top edge to obviate possible stresses with clips in bottom mounting. Such edge supports 22 may be separate physical articles or merely integral portions of glazing 16.

Referring to FIG. 1A, edge supports 22 do not continuously seal, but rather extend middle glazing layer 16 edges away from confronting edges of spacer 13. Boundary layers 30 and 30' inherently form along the respective edges, that is together interact to thermally bridge the edges of surface 13 and the edges of middle layer 16. The boundary layers further restrict convective flow from the first chamber to the second chamber.

As is known in the art, boundary layers are stationary gas particles adjacent to a surface which are restricted from flowing by virtue of viscous forces in fluids. Section 6-3 Boundary Layer Fundamentals are explained at pages 311 et seq. of *Principals of Heat Transfer,* Third Edition, by Frank Kreith (Harper and Row) 1973, hereby incorporated by reference. In the present invention, interacting boundary layers restrict convective heat transfer from a first chamber defined partially by gap 20 to a second chamber defined partially by gap 20', yet they allow for static and long term pressure equalization.

A low emissivity (low-E) coating is highly preferred on at least one glazing surface inside each thermal gap 20, 20'. One way this can be done in a triple glazed window is by placing a low-E coating on the center-facing surface 2 of the outer glazing 12 and the center-facing surface 5 of the inner glazing 14 as shown in FIG. 1. Another way, shown in FIG. 2, is by coating both surfaces 3, 4 of middle glazing 16 with a low-E coating. Other options include coating surfaces 2 and 4 or surfaces 3 and 5. Of course, additional coatings may be added to coat up to all four surfaces enclosed within the I.G. Unit (i.e. surfaces 2, 3, 4, and 5), particularly if high solar transmission low-E coatings are available at a low cost. Precoated glass may be used for the glazings, or ordinary glass may be coated just prior to manufacture. Preferably, the coating will be removed from the edges of the glazing where the glazing is sealed to spacer 13 to insure an intimate bond between the glazing and the spacer.

Typical conventional (standard) low-E coatings have emissivities of about 0.15 or less (meaning they reflect approximately 85% of the radiant heat). Better performing low-E coatings are also available which have emissivities of close to 0.05. Because of the large difference in performance between the standard and better performing low-E coatings, especially when used in conjunction with the low conductivity gaps used in the present invention, low-E coatings having emissivities of less than about 0.10 are preferred in constructing IG units according to the present invention. The methods for coating glass using low-E coatings are described in "Low-E: Piecing Together the Puzzle", by Julie Dolenga, *Glass Magazine*, March 1986, pp. 116–131, which is incorporated herein by reference.

The final step in constructing an IG unit like those shown in FIGS. 1 and 2 requires filling the gas impermeable space 26 with a low conductance gas which permits the use of a small gap between glazings. In many conventional multiple glazed windows ordinary air is used to insulate the space between the glazings. In other conventional windows argon gas is used. However, argon or air filled gaps generally must be at least about 0.5 inches thick for good thermal performance. Thus, to obtain thermal performance like that of a window constructed using the IG unit of the present invention, a conventional window using air or argon would be very bulky and too large for use in most of the residential market. However, by using pure krypton gas, krypton gas mixtures or other similar low conductivity gases, a much smaller gap is required for optimum thermal performance, generally from about 0.20 to about 0.40 inches. Thus, by using pure krypton gas or krypton gas mixtures, the gaps 20 and 20' need only range from about 0.20 to about 0.40 inches, resulting in a thinner triple glazed IG unit which has approximate dimensions close to that of a conventional double glazed IG unit with thermal insulating performance far in excess of such conventional double glazed windows.

While pure krypton gas will provide optimum thermal insulation, a mixture of krypton with one or more other gases can be used. Preferably such a mixture will include at least about 50% krypton. Such mixtures may also use up to about 50% of one or more other gases such as, for example, argon, xenon, carbon dioxide, air or other similar gases.

Conventional gas filled windows are filled through a mechanical process whereby two small holes are drilled through the IG unit's edge, one at the top and the other at the bottom. The gas is pumped into the IG unit through the bottom and air is forced out through the top. When the fraction of air exiting the top hole drops below a certain level, the filling process is stopped. Such processes often spill as much gas into the surrounding air as is the IG unit's volume and usually achieve a fill ratio of approximately 90%. With argon gas, the most common gas used, this spillage rate and fill ratio are acceptable because of argon's cheap cost. With krypton or krypton mixtures, this process could be used although other methods which reduce the spilled gas are preferred due to krypton's higher cost. If one were to use this method to fill the IG units of the present invention, one would provide one or more sealable conduits 34 from the outside of the spacer 13 to the gas impermeable space 26 inside. If there was one conduit at the top of the IG unit and one at the bottom, krypton could be pumped into the gas impermeable space 26 from the bottom, forcing the air in the IG unit out through the top conduit. The conduits could then be sealed, trapping the krypton gas in the gas impermeable space 26. A more efficient means to fill these IG units with krypton or krypton mixture gases would be to use a vacuum chamber to evacuate the IG unit prior to filling with krypton gas or gas mixtures. Yet another alternative for use with krypton mixtures would be to fill the IG unit with the mixing gas (e.g., argon) using the conventional procedure described above and to then pump in the required amount of krypton. If the required krypton percentage is on the order of 60% to 70%, it is expected that all the krypton added will stay in the IG unit.

Figure 3:
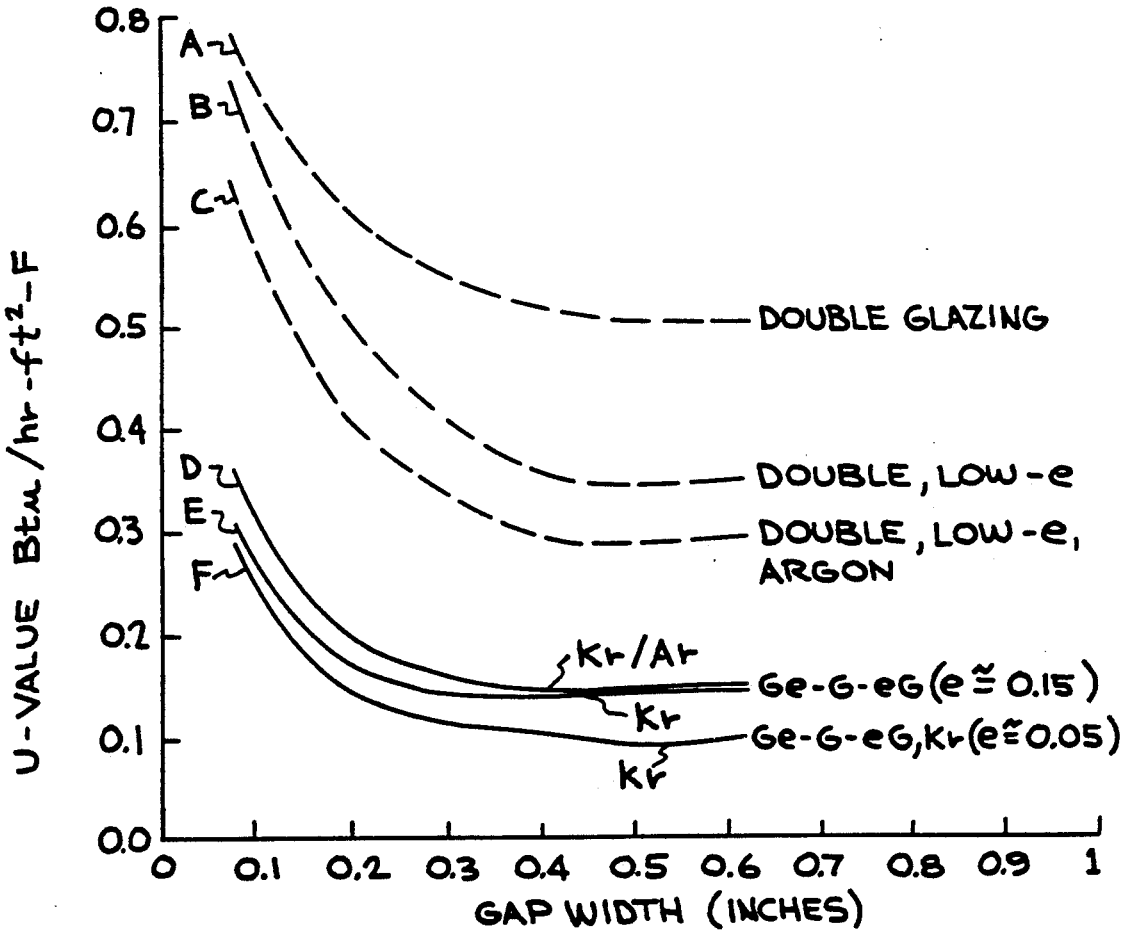
FIG. 3 illustrates the predicted performance of triple glazed IG units of the present invention in comparison with conventional double glazed IG units.

FIG. 3 illustrates the advantages gained by constructing windows according to the present invention. U-values indicate how readily heat flows through a material or building component in the presence of a temperature difference. U-values are given in BTU/hr-ft2-deg F. Thus, the lower the U value, the lower the heat transfer rate and the higher the performance of the window. As can be seen in all the curves plotted in FIG. 3, the optimum thermal gap width between glazings is the smallest gap width which results in the best thermal performance consistent with other window design requirements. Curves A, B, and C show the performance of conventional double glazed windows, double glazed windows with a standard low-E coating (0.15 emissivity), and double glazed windows with a standard low-E coating and argon gas filling respectively. Curves D, E, and F illustrate the comparative predicted performance of krypton filled triple glazed windows constructed according to the present invention which can have about the same dimensions as those of the conventional double glazed windows of curves A,B and C, since good performance with krypton or krypton mixtures is achieved at about 0.25 inch to about 0.35 inch gap widths.

Curves D and E show the predicted performance of a triple glazed IG unit of the present invention which provides a triple glazed unit having two gaps, a standard low-E coating (e=0.15) on the center-facing surfaces of both inner and outer glazings, and a filling of 50/50 krypton/argon and pure krypton respectively. Gap widths of about 0.3 inches result in a U value of about 0.15. Similar results would be predicted using a standard low-E coating on both surfaces of the middle glazing. Since the R value is the reciprocal of the U value, the corresponding R value for the curves D and E would be about R 6.7. This is considerably better than the best conventional window shown in curve C which require a gap close to 0.5 inches and would be rated at about R3.5. Better performance is predicted by curve F which provides a triple glazed IG unit having two gaps, a better performing low-E coating (about 0.05 emissivity) on the center-facing surface of the inner and outer glazings, and a filling of pure krypton. This results in U values close to 0.1 (R10) for gap widths between about 0.25 and 0.30 inches. Again, similar results would be expected from placing the better performing low-E coating on both surfaces of the middle glazing.

Note that the U-values mentioned are center of glass U-values only. With highly insulating windows, the use of spacers and frames with higher thermal conductivities can degrade the performance of the glass edge area and thus alter the window's overall U-value. Low conductance spacers and frames are the subject of current research and will help to optimize the performance of windows using the IG units of the present invention.

Further improvements in thermal insulating performance can be expected by using more than one middle glazing layer. Because the optimum thermal gap for krypton is significantly smaller than that for argon or air, more insulating gaps can be used without resulting in a window too thick or too heavy for practical use. Thus, only the weight and reduction in the transmission of light should limit the number of middle glazings which can be used. Although windows with more than one middle glazing might be too thick for the standard residential market, such windows could find practical use in that fraction of the residential market where glass thickness is not a limitation, and in the construction of commercial buildings or the building of custom windows, where the dimensional constraints imposed by the residential window market have less impact. Regardless of the number of middle glazings used, the preferred method of having at least on surface facing each gap coated with a low-E coating and each gap filled with krypton or a krypton mixture remains the same.

From a manufacturing viewpoint it is most important that the simplicity of fabication be appreciated over that known in the prior art. Conventional assembly involves at least three, outer, middle and inner glazings all individually built up, sealed, precisely arrayed generally with substantially parallel planar surfaces. In the present invention, the much simpler, cost and time efficient assembly of only one outer and one inner glazing is required, with very little additional time being required to interpose the non-sealed, non-structural baffle. Within wide design and manufacturing tolerances and clearances the non-fitted and floating transparent baffle need not extend from the center of the assembly and continuously tightly seal by extending through the inner walls of the chambers. Further yield in manufacture is greatly increased since the middle baffle seal is not required, nor is any fault at final testing cause to reject the unit. In fact, repairs at manufacture or after actual installation may be possible with the present invention since the only sealed glazings are the outer and inner, far more accessible seals. Lifetime may be significantly increased, not only with repair, but also simply because one half fewer, (each glazing to spacer) linear inches of seal are necessary in the invention as compared to the prior art four seal structures.

The invention will be further understood from a consideration of the following example. It should be understood that this example is merely an illustration and is not intended in any way to limit the scope of the claims.

EXAMPLE 1

A 24 inch by 48 inch thermally insulated glazing unit as shown in FIG. 1 could be built by starting with low-e sputter coated nominal ⅛ inch glass. This glass is available from most glass manufacturers and includes, for example, Cardinal IG's (Minneapolis, Minn.) LoE Glass, PPG's (Pittsburg, Pa.) Sungate 100, or Interpane's (Deerfield, Wis.) IPLUS Neutral. Two pieces of 24 inch by 48 inch low-E glass would be required for the other glazing and the inner glazing. The glass edges of these two pieces, for about ½ inch from the edge inward, would be stripped of the low-E coating by, for example, mechanically grinding or burning off.

A piece of 1.5 mm (0.060 inch) thick sheet glass, such as that sold be Erie Scientific (Portsmouth, N.H.) would be suitable for the middle glazing layer.

A suitable spacer would be a conventional ½ inch metal spacer such as that sold by the C. R. Laurence Co. (Los Angeles, Calif.) under catalog number 39109. These spacers are nominally ¼ inch high by ½ inch thick by whatever length is desired. Two spacers ⅞ to 1 inch less than the width of the glass (i.e. 23 to 23⅛ inches long) and two spacers ⅞ to 1 inch less than the height of the glass (i.e. 47 to 47⅛ inches long) would be required to form the spacer frame. The void within each spacer would be filled with a dessicant which will not adsorb krypton gas, such as 3 angstrom effective pore size dessicant which is available from Davison Chemical Co., Grace Division (Baltimore, Md.), under catalog number 56408080237, and then the spacer frame is formed by connecting the spacers together using corner keys, such as those available from the C. R. Laurence Co. (Los Angeles, Calif.) under catalog number 6279. Holes about ⅛ inch in diameter would be drilled through the spacer frame for gas filling, with one hole at the bottom of the spacer frame and one hole at the top of the spacer frame.

Metal clips would be milled from the same metal as the spacers and then clipped to the middle glazing layer. The middle glazing would then be placed inside the spacer frame. The metal clips would then be attached to the spacer frame if necessary, for example, by soldering.

Polyisobutylene sealant such as that available from the C. R. Laurence Co. (Los Angeles, Calif.) under catalog number 2132559) would be used to form the primary seal. The primary sealant would be placed on the spacer frame, and then the spacer frame containing the middle glazing layer would be sandwiched between the inner and outer glazing layers. The inner and outer glazing layers would be oriented during assembly of the unit such that the coated surfaces of each faced the middle glazing layer.

Following cure of the primary seal, the assembly would be filled with Krypton gas, such as that available from AIRCO Specialty gasses (Murray Hill, N.J.), the fill holes plugged, and the unit sealed with a secondary sealant such as Morton Thiokol's (Princeton, N.J.) polysulfide 800 to 810 or Bostik's (Huntington Valley, Pa.) polyurethane 3180.

While the preferred embodiment of the present invention has been illustrated and described in detail, various modifications of, for example, components, materials and parameters, will become apparent to those skilled in the art, and it is intended to cover in the appended claims all such modifications and changes which come within the scope of this invention.

What is claimed is:

1. An insulated glazing unit for constructing thermal windows comprising:

an outer glazing having an exterior surface and a center-facing surface, an inner glazing having an interior surface and a center-facing surface, said inner glazing being held parallel to and spaced away from said outer glazing such that the center-facing surface of said outer glazing and the center-facing surface of said inner glazing face each other, a means for sealing said inner glazing and said outer glazing together to form a gas impermeable space between said inner glazing and said outer glazing;

at least one middle glazing held substantially parallel to, between and spaced away from said center-facing surface of said outer glazing and said center-facing surface of said inner glazing to form at least two thermal gaps;

a low emittance coating having an emissivity of less than about 0.15 on at least one glazing surface facing each said thermal gap; and, a low conductance gas comprising krypton entrapped within said gas impermeable space.

2. The insulated glazing unit of claim 1 having one said middle glazing.

3. The insulated glazing unit of claim 2 in which said low emittance coatings are placed on said center-facing surface of said outer glazing and said center-facing surface of said inner glazing, or on both surfaces of said middle glazing, or on said center-facing surface of said outer glazing and the surface of said middle glazing facing said inner glazing, or on said center-facing surface of said inner glazing and the surface of said middle glazing facing said outer glazing.

4. The insulated glazing unit of claim 3 in which said low emittance coating has an emissivity of less than about 0.10.

5. The insulated glazing unit of claim 1 in which each said middle glazing is spaced away from any other glazing to form thermal gaps of from about 0.20 inch to about 0.40 inch.

6. The insulated glazing unit of claim 1 in which said low conductance gas comprises at least about 50% krypton by volume.

7. The insulated glazing unit of claim 1 in which said glazings are formed from glass.

8. The insulated glazing unit of claim 1 additionally comprising a means for placing said low conductance gas into said gas impermeable space.

9. An about R5 to about R10 rated triple-glazed insulated glazing unit for use in constructing thermal windows comprising:

a spacing means constructed to be gas impermeable and having a first side adapted to receive an outer glazing, a second side parallel to and spaced away from said first side adapted to receive an inner glazing, and an interior adapted to receive a middle glazing;

an outer glazing having an exterior surface and a center-facing surface, said outer glazing being sealed to said first side of said spacing means such that said center-facing surface of said outer glazing faces said second side of said spacing means and such that said outer glazing when sealed to said spacing means forms a gas impermeable barrier;

an inner glazing having an interior surface and a center-facing surface, said inner glazing being sealed to said second side of said spacing means such that said center-facing surface of said inner glazing faces said center-facing surface of said outer glazing and such that said inner glazing when sealed to said spacing means containing said outer glazing forms a gas impermeable space;

a middle glazing attached to said spacing means and held between said center-facing surface of said outer glazing and said center-facing surface of said inner glazing to form two thermal gaps of from about 0.20 inch to about 0.40 inch in size;

a low emittance coating, having an emissivity of less than about 0.10, on at least one glazing surface facing each said thermal gap; and, a low conductance gas comprising krypton entrapped within said gas impermeable space formed by said outer glazing, said inner glazing, and said spacing means.

10. The insulated glazing unit of claim 9 additionally comprising a means for placing said low conductance gas into said gas impermeable space.

11. The insulated glazing unit of claim 9 in which said inner and outer glazings are constructed from glass having a thickness of from about 0.090 inch to about 0.250 inch.

12. The insulated glazing unit of claim 9 in which said middle glazing is constructed from glass having a thickness of no more than about 0.125 inch.

13. The insulated glazing unit of claim 9 in which said low emittance coatings are placed on said center-facing surface of said outer glazing and said center-facing surface of said inner glazing, or on both surfaces of said middle glazing, or on said center-facing surface of said outer glazing and the surface of said middle glazing facing said inner glazing, or on said center-facing surface of said inner glazing and the surface of said middle glazing facing said outer glazing.

14. A thermally insulated window assembly comprising:

(a) at least one multiple glazing assembly, each said multiple glazing assembly comprising an outer glazing having an exterior surface and a center-facing surface, an inner glazing having an interior surface and a center-facing surface, said inner glazing being held parallel to and spaced away from said outer glazing such that the center-facing surface of said outer glazing and the center-facing surface of said inner glazing face each other, at least one middle glazing held parallel to, between and spaced away from said center-facing surface of said outer glazing and said center-facing surface of said inner glazing to form at least two thermal gaps and, low emittance coatings having an emissivity of less than about 0.15 on one or more of said glazing surfaces;

(b) a window frame adapted to receive at least one said multiple glazing assembly, said window frame constructed to form a gas impermeable space between said outer glazing, said inner glazing, and said window frame when said multiple glazing assembly is sealed in said window frame; and, (c) a low conductance gas comprising krypton entrapped within said gas impermeable space.

15. The window assembly of claim 14 in which each said middle glazing is spaced away from any other glazing to form thermal gaps of from about 0.20 inch to about 0.40 inch.

16. The window assembly of claim 14 in which said low emittance coating is placed on at least one glazing surface facing each said thermal gap.

17. The window assembly of claim 14 having one said middle glazing.

18. The window assembly of claim 17 in which said low emittance coating is placed on said center-facing surface of said outer glazing and said center-facing surface of said inner glazing, or on both surfaces of said middle glazing, or on said center-facing surface of said outer glazing and the surface of said middle glazing facing said inner glazing, or on said center-facing surface of said inner glazing and the surface of said middle glazing facing said outer glazing.

19. The window assembly of claim 14 in which said low conductance gas comprises at least about 50% krypton by volume.

20. The window assembly of claim 14 additionally comprising a means for placing said low conductance gas into said gas impermeable space.

21. In an insulated window glazing structure of the type utilizing outer and inner window glazings and a sealed housing, the improvement comprising, a postionally tolerant transparent baffle sized to fit entirely within the housing inner walls, interposed between inner and outer glazings to define and further to restrict convective current communication between the resulting chambers, the baffle being otherwise substantially free of predetermined cooperation and orientation with respect to the glazings.

* * * * *